(12) United States Patent
Niemeyer et al.

(10) Patent No.: US 10,642,130 B2
(45) Date of Patent: May 5, 2020

(54) MOTORIZED MONOPOD JIB FOR CAMERAS

(71) Applicant: Disney Enterprises, Inc., Burbank, CA (US)

(72) Inventors: Gunter Niemeyer, Pasadena, CA (US); Miquel Angel Farre Guiu, Bern (CH); Vince Roberts, Thousand Oaks, CA (US); Anthony Accardo, Glendale, CA (US); Michael Holton, Manhattan Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/730,303

(22) Filed: Oct. 11, 2017

(65) Prior Publication Data

US 2018/0031952 A1    Feb. 1, 2018

Related U.S. Application Data

(63) Continuation of application No. 14/934,043, filed on Nov. 5, 2015, now Pat. No. 9,798,221.
(Continued)

(51) Int. Cl.
*G03B 17/56* (2006.01)
*F16M 11/18* (2006.01)
(Continued)

(52) U.S. Cl.
CPC .......... *G03B 17/561* (2013.01); *F16M 11/10* (2013.01); *F16M 11/18* (2013.01);
(Continued)

(58) Field of Classification Search
CPC ..................................................... F16M 13/04
(Continued)

(56) References Cited

U.S. PATENT DOCUMENTS 4,017,168 A    4/1977    Brown
4,946,272 A    8/1990    Brown
(Continued)

FOREIGN PATENT DOCUMENTS

CN    202647109 U    1/2013
CN    103901709    *    7/2014    ............. G03B 21/56
(Continued)

OTHER PUBLICATIONS

Gil Zamorano, Gunnar, European Search Report for European Patent Application Serial No. 17194823, dated Mar. 7, 2018, 3 pages, Munich, Germany.
(Continued)

*Primary Examiner* — Clayton E. LaBalle
*Assistant Examiner* — Kevin C Butler
(74) *Attorney, Agent, or Firm* — Patterson + Sheridan, LLP

(57) ABSTRACT

An embodiment provides a motorized monopole for a camera, including: a hand-held monopole; a first motor positioned at an end of the hand-held monopole; a first connecting element attached to the first motor; a second motor positioned at an end of the first connecting element; a second connecting element attached to the second motor; a third motor positioned at an end of the second connecting element; and a camera mounting plate attached to the second connecting element by the third motor, where components of the multi-axis gimbal are positioned such that a camera viewing axis, a horizontal image axis, and a vertical image axis of a camera mounted on the camera mounting plate need not be aligned with any of a rotational axis of the first motor, a rotational axis of the second motor, or a rotational axis of the third motor. Other aspects are described and claimed.

21 Claims, 8 Drawing Sheets

Related U.S. Application Data

(60) Provisional application No. 62/119,077, filed on Feb. 20, 2015.

(51) Int. Cl.
*F16M 11/10* (2006.01)
*F16M 11/20* (2006.01)
*F16M 13/00* (2006.01)
*F16M 13/04* (2006.01)

(52) U.S. Cl.
CPC ........ *F16M 11/2071* (2013.01); *F16M 13/00* (2013.01); *F16M 13/04* (2013.01); *F16M 2200/041* (2013.01); *F16M 2200/044* (2013.01); *G03B 17/563* (2013.01); *G03B 17/566* (2013.01)

(58) Field of Classification Search
USPC ........................................................ 396/421
See application file for complete search history.

(56) References Cited

U.S. PATENT DOCUMENTS

| | | | |
|---|---|---|---|
| 5,065,249 A | 11/1991 | Horn et al. | |
| 5,963,749 A * | 10/1999 | Nicholson | F16M 11/105 396/421 |
| 6,611,662 B1 | 8/2003 | Grober | |
| 6,808,324 B2 * | 10/2004 | McKay | G03B 17/02 396/421 |
| 7,209,176 B2 * | 4/2007 | Chapman | F16M 11/10 248/187.1 |
| 7,241,060 B2 * | 7/2007 | Mootz | F16M 11/041 248/187.1 |
| 7,355,627 B2 | 4/2008 | Yamazaki et al. | |
| 7,522,213 B2 | 4/2009 | Chapman | |
| 7,931,412 B2 * | 4/2011 | Brown | F16M 11/2035 396/421 |
| 8,125,564 B2 | 2/2012 | Kozlov et al. | |
| 8,142,083 B2 * | 3/2012 | Brown | F16M 11/2035 352/243 |
| 8,534,934 B1 | 9/2013 | Carney | |
| 9,156,154 B2 * | 10/2015 | Brown | B25H 1/0021 |
| 9,360,740 B2 * | 6/2016 | Wagner | F16M 11/18 |
| 9,454,064 B2 * | 9/2016 | Roberts | G03B 17/561 |
| 9,534,730 B2 * | 1/2017 | Black | F16M 11/10 |
| 9,749,522 B2 | 8/2017 | Holmes | |
| 9,765,926 B2 * | 9/2017 | Chen | F16M 13/04 |
| 9,798,221 B2 * | 10/2017 | Niemeyer | F16M 11/18 |
| 9,851,046 B2 | 12/2017 | Pan et al. | |
| 9,874,308 B2 | 1/2018 | Saika et al. | |
| 9,904,147 B2 | 2/2018 | Zhao | |
| 9,921,459 B2 | 3/2018 | Wagner et al. | |
| 9,973,665 B2 | 5/2018 | Saha et al. | |
| 10,107,446 B2 | 10/2018 | Pan et al. | |
| 10,208,887 B2 | 2/2019 | Tian et al. | |
| 2004/0223078 A1 | 11/2004 | Zadok | |
| 2005/0185089 A1 | 8/2005 | Chapman | |
| 2009/0003822 A1 | 1/2009 | Tyner | |
| 2011/0158619 A1 | 6/2011 | Kanayama | |
| 2012/0099851 A1 | 4/2012 | Brown | |
| 2014/0350395 A1 | 11/2014 | Shachaf et al. | |
| 2015/0219981 A1 | 8/2015 | Roberts et al. | |
| 2016/0033077 A1 | 2/2016 | Chen et al. | |
| 2016/0170289 A1 | 6/2016 | Matt | |
| 2016/0246162 A1 | 8/2016 | Niemeyer et al. | |
| 2016/0309080 A1 | 10/2016 | Chu et al. | |
| 2016/0323496 A1 | 11/2016 | Tsai et al. | |
| 2017/0159875 A1 | 6/2017 | Wagner et al. | |
| 2017/0227162 A1 | 8/2017 | Saika et al. | |
| 2018/0149949 A1 | 5/2018 | Kim et al. | |
| 2018/0273203 A1 | 9/2018 | Zhang et al. | |
| 2018/0274720 A1 | 9/2018 | Gubler et al. | |
| 2018/0335178 A1 | 11/2018 | Bin et al. | |
| 2019/0002125 A1 | 1/2019 | Bin et al. | |

FOREIGN PATENT DOCUMENTS

| | | | | |
|---|---|---|---|---|
| CN | 203761488 | * | 8/2014 | ............ G03B 21/56 |
| CN | 203811969 | * | 9/2014 | ............ G03B 17/56 |
| CN | 203812021 U | | 9/2014 | |
| CN | 104360690 A | | 2/2015 | |
| CN | 204227000 U | | 3/2015 | |
| CN | 204437648 U | | 7/2015 | |
| CN | 106168326 | * | 11/2016 | ............ F16M 11/06 |
| EP | 2919064 A1 | | 9/2015 | |
| EP | 3316567 A1 | | 5/2018 | |
| ES | 2564393 A1 | | 3/2016 | |
| KR | 20160099437 A | | 8/2016 | |
| WO | 2016190994 A1 | | 12/2016 | |

OTHER PUBLICATIONS

Antsheer, Martijn, European Search Report for European Application No. EP18178234, dated Oct. 30, 2018, The Hague, Netherlands, 6 pages.

\* cited by examiner

_US 10,642,130 B2_

MOTORIZED MONOPOD JIB FOR CAMERAS

CROSS REFERENCE TO RELATED APPLICATIONS

This application is a continuation application of U.S. application Ser. No. 14/934,043, filed Nov. 5, 2015, which is a non-provisional of U.S. Application Ser. No. 62/119,077, filed on Feb. 20, 2015, which is incorporated by reference herein.

BACKGROUND

A three-axis gimbal is used in camera stabilization systems to give the camera operator freedom of motion during shooting while reducing visual artifacts in the shot due to that motion, e.g., camera vibration or shake. A stabilized or controlled gimbal, e.g., using brushless motors, has the ability to keep a camera at a predetermined angle, e.g., level on all axes, as the camera operator moves the camera about. An inertial measurement unit (IMU) responds to movement and uses motors in a coordinated fashion to stabilize the camera. Guidance instructions or logic permit a stabilizer system to detect and respond to differences between deliberate movement of the camera operator and unintentional movement, e.g., shaking.

BRIEF SUMMARY

In summary, one embodiment provides a motorized multi-axis gimbal for a camera, comprising: an attachment for securing a hand-held monopole; a plurality of motors connected to the multi-axis gimbal; and an attachment for a camera mounting plate; the plurality of motors providing a plurality of independent rotational axes for movement of gimbal components; and the plurality of motors in operative connection with a processing unit that issues coordinated rotational commands to control movement of an attached camera; wherein components of the multi-axis gimbal are positioned such that a camera viewing axis, a horizontal image axis, and a vertical image axis of a camera mounted on the camera mounting plate need not be aligned with any of a rotational axis of the plurality of motors Another embodiment provides a motorized monopole for a camera, comprising: a hand-held monopole attached to a multi-axis gimbal; a first motor positioned at an end of the hand-held monopole; a first connecting element of the multi-axis gimbal attached to the first motor, the first motor imparting active rotational movement to the first connecting element with respect to the monopole; a second motor positioned at an end of the first connecting element; a second connecting element of the multi-axis gimbal attached to the second motor, the second motor imparting active rotational movement to the second connecting element with respect to the first connecting element; a third motor positioned at an end of the second connecting element; and a camera mounting plate of the multi-axis gimbal attached to the second connecting element via the third motor, the third motor imparting active rotational movement to the camera mounting plate with respect to the second connecting element; wherein components of the multi-axis gimbal are positioned such that a camera viewing axis, a horizontal image axis, and a vertical image axis of a camera mounted on the camera mounting plate need not be aligned with any of a rotational axis of the first motor, a rotational axis of the second motor, or a rotational axis of the third motor.

A further aspect provides a motorized multi-axis gimbal for a camera, comprising: an attachment for securing a hand-held monopole; a first motor positioned at the attachment and imparting active rotational movement about a first axis of rotation; a second motor imparting active rotational movement about a second a second axis of rotation; a third motor operatively coupled to a camera mounting plate, the third motor imparting active rotational movement about a third axis of rotation; wherein components of the multi-axis gimbal are positioned such that a camera viewing axis, a horizontal image axis, and a vertical image axis of a camera mounted on the camera mounting plate need not be aligned with any of a rotational axis of the first motor, a rotational axis of the second motor, or a rotational axis of the third motor.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
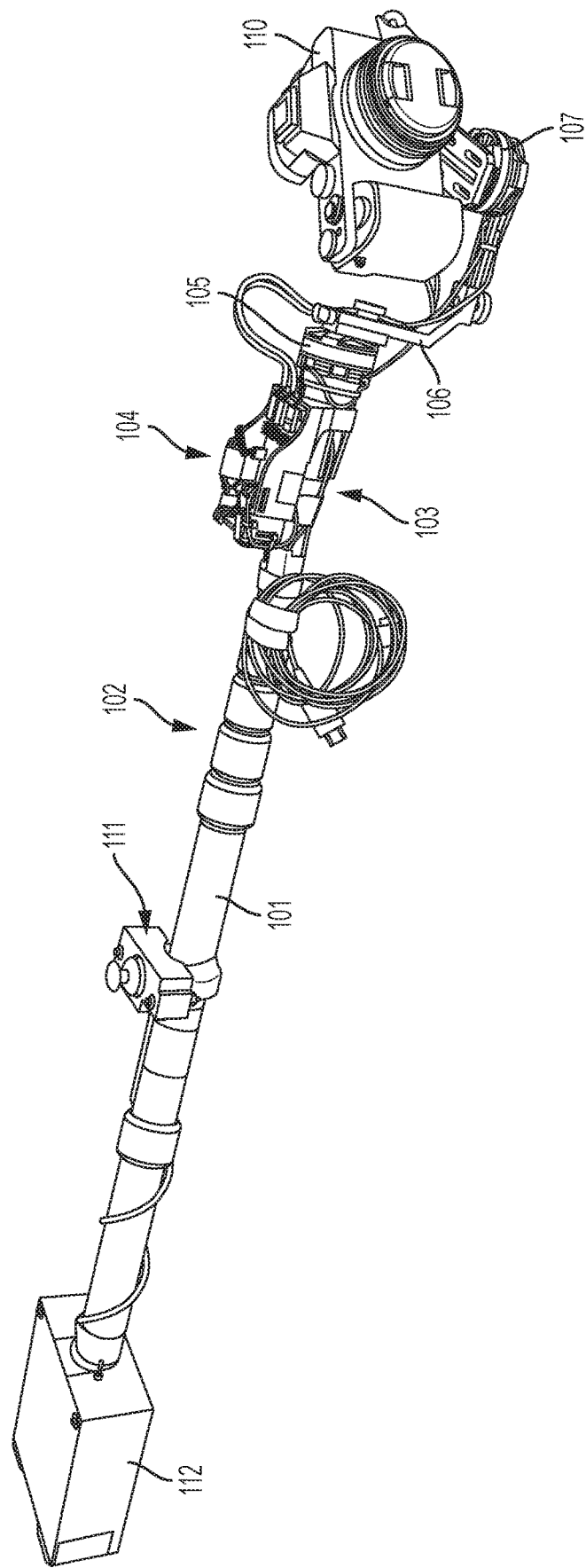
FIG. 1 illustrates a view of an example motorized, hand-held monopole.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

An embodiment provides a hand-held jib ("jib," "monopod," "monopole" and "boom" are used interchangeably herein), e.g., as described in co-pending and commonly assigned U.S. patent application Ser. No. 13/843,878, filed on Mar. 15, 2013; and Ser. No. 14/172,442, filed on Feb. 2, 2014, the contents of each of these applications is incorporated by reference herein. An embodiment provides a serial arrangement of a monopole, an attachment for fixing the monopole to a gimbal, a gimbal (for example a three-axis gimbal including three motors and linkages or connecting element(s)), a camera platform, and a camera. In an embodiment, a multi-axis gimbal is provided by virtue of a plurality of motors (e.g., three or more) arranged to provide rotational movement about independent axes. The motors may have their movements coordinated to provide active movement of a camera (e.g., panning, tilting or rotating of the camera's viewing axis or angle) as well as coordinated stabilization of the camera.

An embodiment uses sensors to provide active stabilization as well as assisted camera movement. For example, an embodiment may include one or more inertial measurement units (IMU), including for example accelerometer(s) that detect accelerations, gyroscope(s) that detect changes in rotational attributes like pitch, roll and yaw, and in some cases also including magnetometers, e.g., to assist in managing orientation drift.

Use of such active stabilization and control permits an embodiment to stabilize a camera mounted on the end of a monopole and to control the movement of the camera in pitch, yaw and roll with respect to a camera operator's commands. The camera operator may provide commands via a user interface mounted for example on the monopole and/or via movement, e.g., rotation, of the monopole or boom itself. An embodiment stabilizes and controls the camera with degree(s) of freedom, e.g., tilt, roll and/or pan, that are controlled via motorized action for example provided by brushless motors at various axis points in the unit. This allows the camera operator to remain in control of the shot even when moving the monopole.

In an embodiment, a support unit, e.g., gimbal or like structural element(s), is/are provided with an offset. By way of example, as opposed to a gimbal including a motor positioned approximately 90 degrees from the line of sight of the camera (i.e., to the left or right), an embodiment repositions the motor to be mounted at approximately 45 degrees further to the right or left of the camera view axis, e.g., by mounting the camera on the camera mounting plate at an angle, e.g., about 45 degrees. In other words, when the gimbal is operating and the camera is commanded to look forward, the motor thus has to move approximately 135 degrees, e.g., to the left/behind the camera. This permits the camera operator to take shots that are unencumbered by various supporting structures, e.g., motors or support elements of the unit, opening up a wider range of useable shot angles.

In an embodiment, motors (e.g., DYS BGM4108-130 or FOXTECH motors) may be controlled by a user interface, such as a joystick type controller or other suitable user interface, to point the camera at a target location. For example, the user may select the target location by manipulating the user interface joystick and/or manipulation of the boom, or even by specifying a distance from the camera or an altitude. The target location may be fixed or the target location may vary, e.g., to track a moving target object. For example, the location of a moving target object may be determined automatically by computationally examining the image and determining the location of a main or target object within the image.

In an embodiment, the orientation of the monopole may be used as a command signal to determine the desired orientation, e.g., pan or tilt of the camera. This may be in addition to the commands issued from the user interface or joystick. For example, as the operator rolls the monopole, as sensed via one or more sensors, the motors may be moved to pan or tilt the camera. Alternatively, as the operator tilts the monopole, the motors may be moved to pan or tilt the camera. The command signal may be further filtered to retain camera stabilization in combination with user control of camera orientation. As one skilled in the art will recognize, the example embodiments may be combined to create a system of stabilization and control that regulates the camera orientation relative to user movements.

An embodiment allows the operator to specify the camera movements in the image frame. In an embodiment, an operator may touch a point in the image, e.g., as displayed on a touch screen display user interface, to provide an input allowing the camera to move in that direction. For example the operator can pan the image left or right, or the operator may tilt the image up or down. The user inputs to the user interface may be processed to control the motor(s) of the gimbal to reorient the camera's viewing axis. The movement may be coordinated automatically, e.g., camera roll may be automatically controlled such that the image remains level during the pan or tilt movement commanded by the user. Furthermore, the movement of the motors may be coordinated based on commands obtained from vision processing. For example, a user may control the view of the camera to keep focus on a particular face in an image, to track an object, etc. As another example, the commands may be based on a focal distance, e.g., taking a view in the middle of an image, based on the focal distance, and calculating the point in space to obtain a fixed point for the camera to view.

In an embodiment, the camera is mounted onto the gimbal with a rotational offset or at an angle, where the gimbal axes do not align with the camera axes. For example, pan, tilt or roll may not map directly to the three rotational axes of the motors of the gimbal. Instead an algorithm creates compound movements for the motors to enable operators to specify pan, tilt, or roll of the camera and its view.

The camera also may be mounted with an offset angle to orient the useable range of motion toward the most likely target area. An example of a 45 degree offset angle is used throughout as an example, although this angle may be selected to suit a particular purpose. Placing the camera at an offset means the useable range of camera angles is targeted to one side with respect to the monopole. This also provides an asymmetry or handedness (e.g., left handed or right handed set up). Having the camera offset to one side is not a detriment to obtaining shots with the camera on the other side, as the motors may be commanded to flip the camera upside down, for example, in which case the useable range of angles is targeted to the other side. Electronic processing can be used to rotate the image right-side up in such a condition. Thus, with an appropriate mode selection, the user can gain access to both ranges of motion with simple commands, increasing the overall useable range.

The user interface may use a joystick style interface, although as with other elements described throughout a joystick is not a requirement. The user interface may command image pan or tilt through operation of the motors. The user interface may command a rate of change of pan or tilt. For example, when a user pushes a joystick type user interface, the camera keeps moving at a pre-determined rate, whereas on release of the joystick, the camera movement stops. The user interface may alternatively command values of pan or tilt. For example, when a user pushes a joystick type user interface, the camera moves to some predetermined angle or increment, whereas on release of the joystick, the camera returns to a zero angle or its original position or a predetermined position, etc.

The user may provide camera control (e.g., pan or tilt) by reorienting the boom. For example, rolling the boom about the main boom axis (without changing the camera's location) may act as a command to pan/tilt the camera.

The camera may also be stabilized to remain fixed with respect to world, i.e., always point in the same absolute direction. Additionally, the camera may be stabilized to remain fixed relative to the operator. For example, if the operator turns to the right, the camera will also turn to the right.

As will be apparent to those having ordinary skill in the art, the various embodiments may be combined to create an intuitive and capable interface.

The description now turns to the figures. The example embodiments will be best understood with reference to the figures, which illustrated certain representative example embodiments.

Referring to FIG. 1, an example motorized, hand-held monopole for a camera is illustrated. In FIG. 1 is it shown that the monopole 101, which may include a telescopic region 102, is configured to be a hand-held unit. The user may operate the motorized monopole 101 using one or two hand operation.

Figure 4:
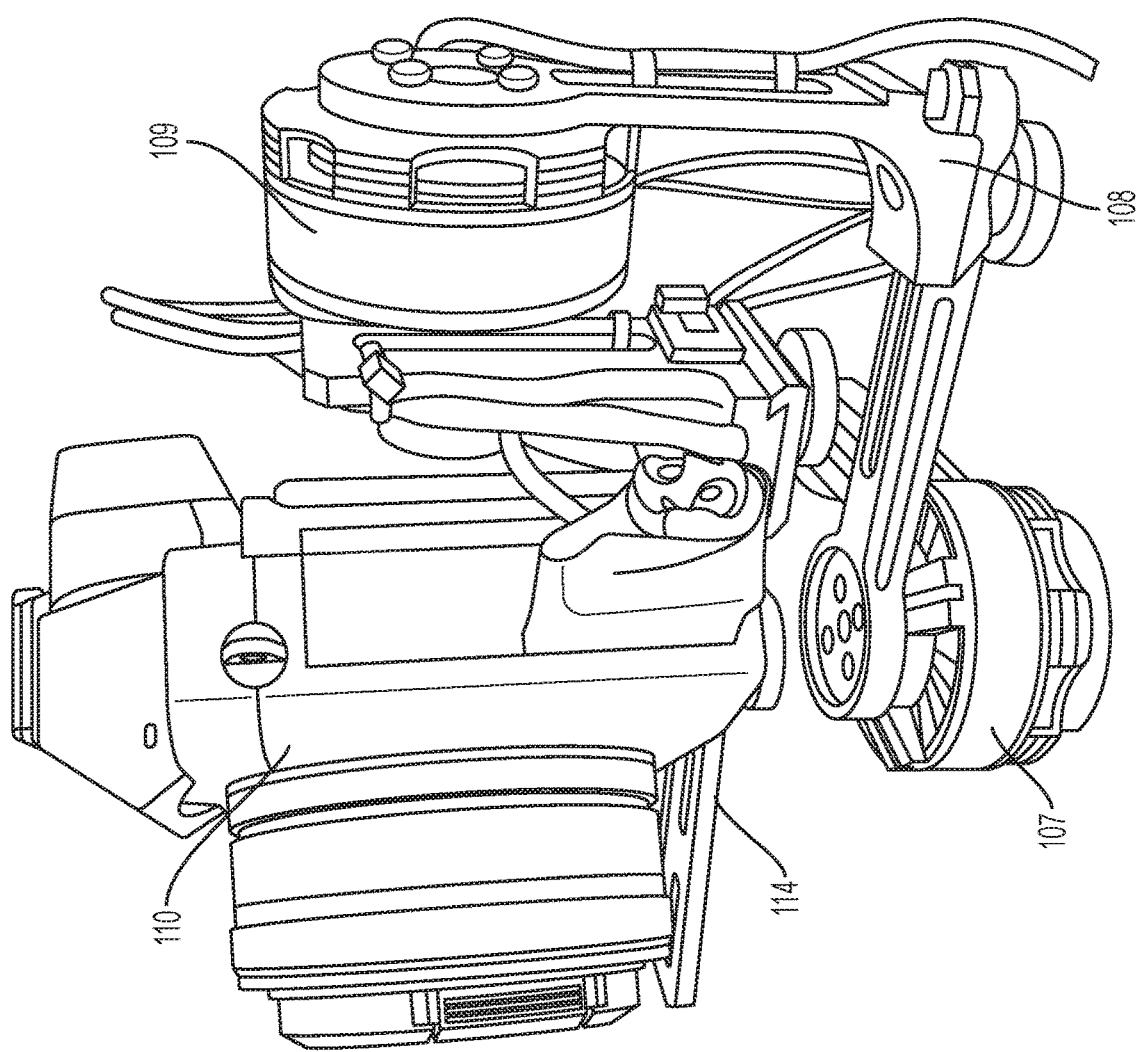
FIG. 4 illustrates a view of a camera attached to the three-axis gimbal.

At one end of the monopole 101 is a three-axis gimbal that includes a first motor 105, a connecting element 106, a second motor 107, a second connecting element (element 108, illustrated in FIG. 4), a third motor (element 109, illustrated in FIG. 4) and a camera mounting plate (element 114, illustrated in FIG. 4). Elements of the gimbal may be provided in series, i.e., one connected to the next; however, different arrangements of these elements or more or fewer elements may be provided. By way of example, in an embodiment a three-axis gimbal is provided such that three motors, e.g., 105, 107 and 109, provide three independent or different possible axes of rotation to the gimbal. More motors may be provided to offer additional axes of rotation. Likewise, other arrangements of connecting elements may be provided. The three-axis gimbal illustrated by way of example in the figures provides an offset from the monopole 101 such that the camera 110, mounted on camera mounting plate 114, can move in a wide range of motion depending on the needs of the user.

As illustrated in FIG. 1, the first motor 105 is oriented such that it rotates about an axis running along a long axis of the monopole 101, i.e., the main boom axis of rotation. This is not a strict requirement, as will become apparent through reviewing the description provided herein. The first motor 105 may therefore provide rotational movement of the first connecting element 106 with respect to the monopole or a connection thereto (element 115, illustrated in FIG. 5). This re-orients the position of the second motor 107, as it is attached to the first connecting element 106.

The first connecting element 106 and the second motor 107 are in turn attached to the second connecting element 108 and the third motor 109, as illustrated in FIG. 4. The second motor 107 rotates about a unique axis as compared to the first motor 105, such that the second motor 107 independently may rotate the second connecting element 108 with respect to the first connecting element 106. In this way, two degrees of freedom are achieved by the placement of the first motor 105 and the second motor 107.

Figure 2:
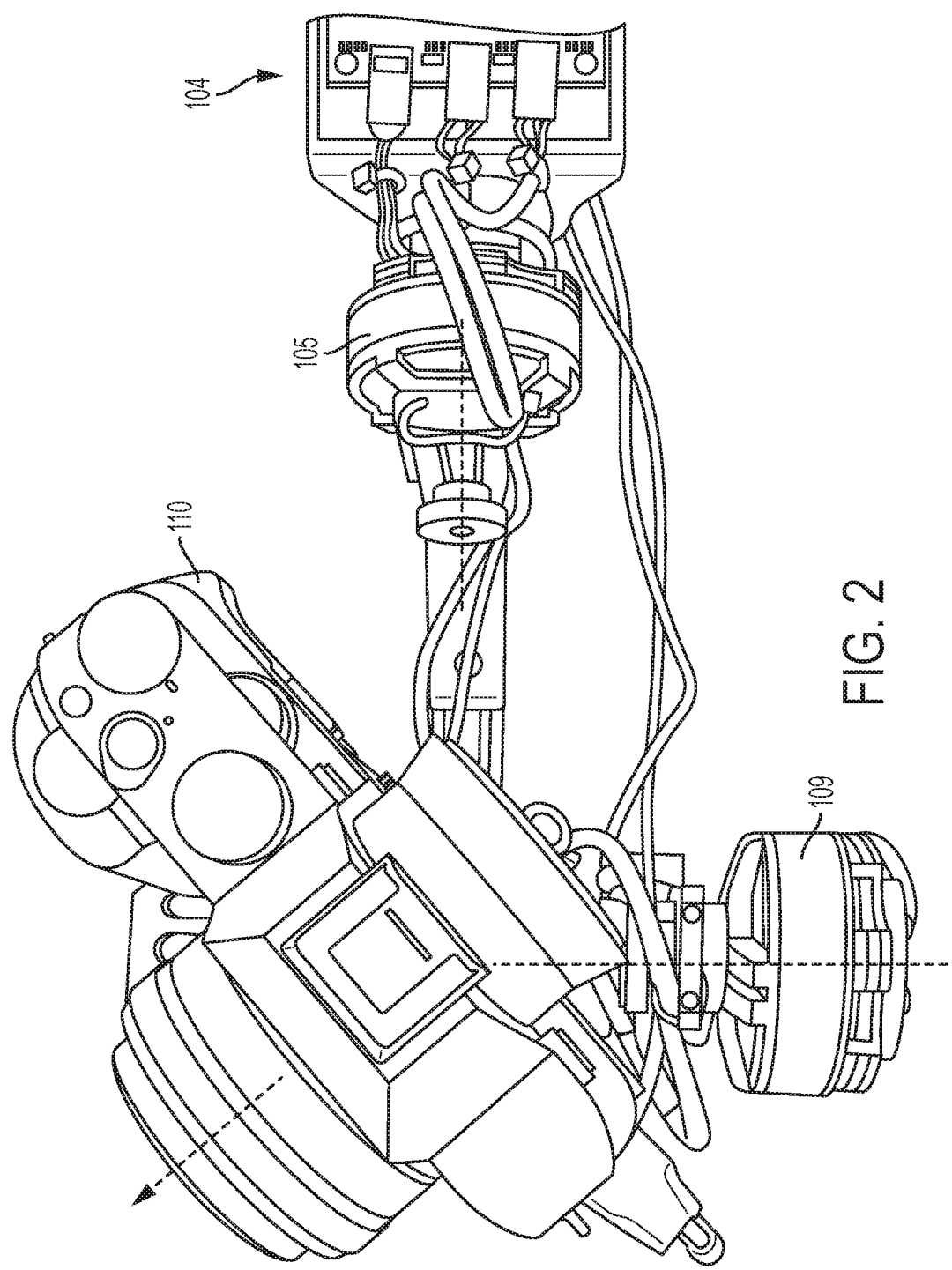
FIG. 2 illustrates a view of an example motorized, three-axis gimbal attached to a hand-held monopole with a camera.
Figure 3:
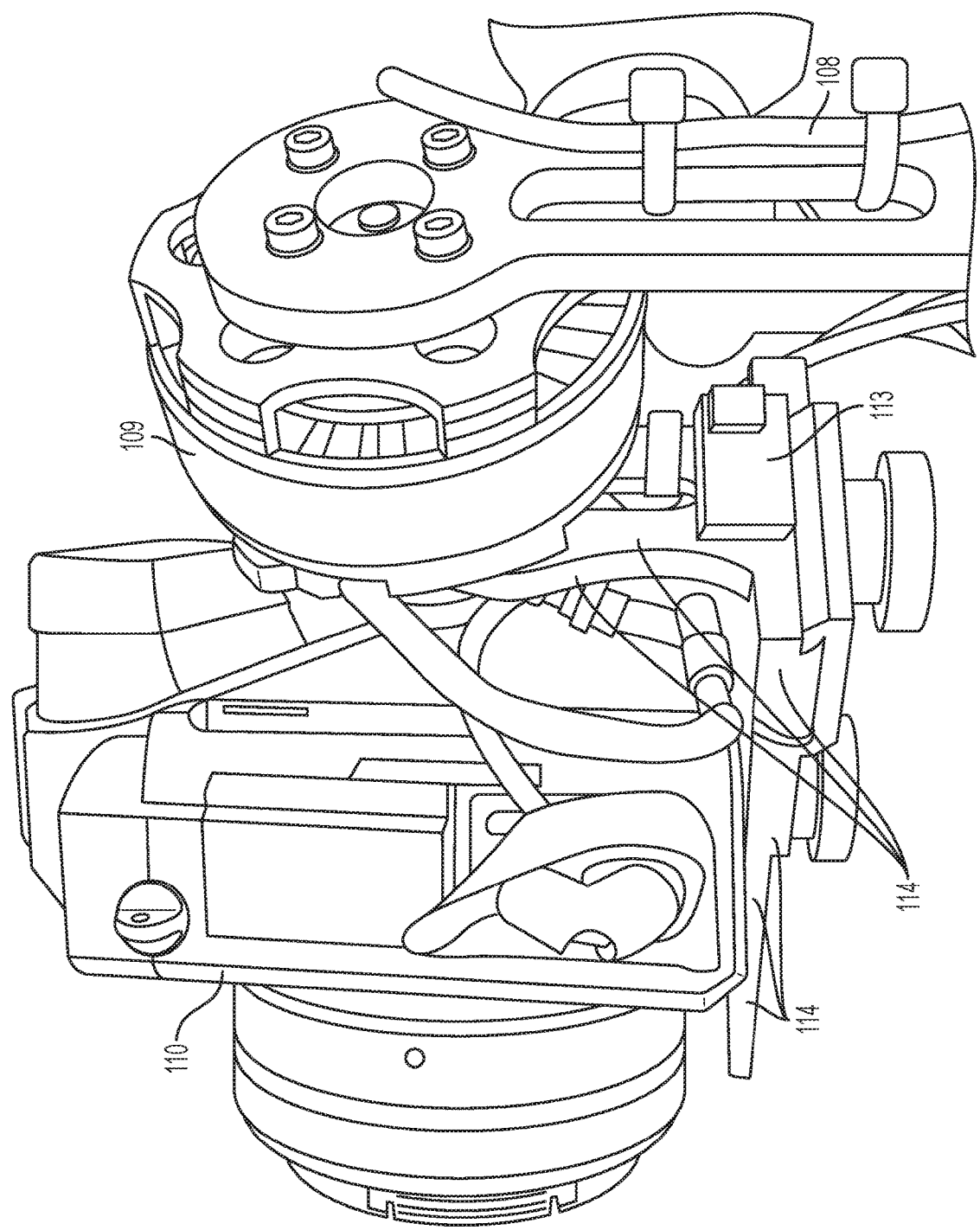
FIG. 3 illustrates a close up view of a camera sitting on a camera mounting plate attached to one end of the three-axis gimbal.

As illustrated in FIG. 2 and FIG. 3, a third motor 109 is connected to the second connecting element 108 and the camera mounting plate 114. The third motor 109 rotates on an axis unique with respect to the first motor 105 and second motor 107, such that a third degree of freedom is achieved. As may be appreciated, depending on the orientation the user places the monopole 101 in, each of the first motor 105, second motor 107 and third motor 109 may contribute to adjusting or stabilizing the pan, tilt or rotation of the camera 110 and thus of the image (video data or still image) captured by the camera 110.

FIG. 2 offers at top view of the three-axis gimbal of an embodiment in which the camera 110 is illustrated as sitting on the camera mounting plate 114 at an angle with respect to the axis running along the length of the monopole 101. It may be appreciated that if the axis running along the length of the monopole 101 is considered normal, the camera 110 is offset to a viewing axis that is about 45 degrees from normal (in this example, looking to the right). Likewise, it may be appreciated that the third motor 109 is positioned about 90 degrees (to the left in this example) from normal or about 135 degrees from the axis or view of the camera 110. It may be appreciated that the first motor 105, second motor 107 and third motor may coordinate their rotation about their respective axes of rotation to control the roll, pitch or tilt of the camera mounting plate 114 and thus of the camera 110.

As may be further appreciated from reviewing FIG. 2, neither the camera viewing axis (dashed arrow), nor the horizontal axis in the image produced by the camera, nor the vertical axis in the image produced by the camera need to be aligned (or even closely aligned) with any of the motor axes (two of which are illustrated with dashed lines in FIG. 2). Practically, the camera 110 and motors 105, 107 and 109 are at offset angles. Some axes may still be orthogonal relative to each other, but some axes are not. This configuration has benefits in range of motion, keeping the motors/gimbal out of the image, etc. In contrast to a pair-wise comparison of axes, i.e., motor 105 axis compared to motor 107 axis, motor 107 axis to motor 109 axis, motor 109 axis to camera 110 viewing axis, motor 109 axis to image horizontal axis, motor 109 axis to image vertical axis, a conventional system would keep these either orthogonal or parallel (or nearly so). In an embodiment, these axes are deliberately set at offset angles, as illustrated. As described herein, this imparts and asymmetry to the system (the system illustrated is configured for right handed use).

A closer view of an example camera mounting plate 114 is provided in FIG. 3. The camera mounting plate 114 may take the shape of an "L" or generally an element that includes two edges oriented at about 90 degrees to one another. In the example shown in FIG. 3, the camera 110 is attached to the camera mounting plate 114 using screws. As described herein, one or more IMUs may be provided. One IMU 113 is illustrated in FIG. 3 in a position attached to the camera mounting plate 114. The IMU 113 at the camera mounting plate 114 provides feedback data regarding the position, orientation, acceleration, etc., of the camera mounting plate 114 to a control module 104 (referring back to FIG. 1). This provides data allowing inertial stabilization of the camera 110 by the first motor 105, the second motor 107 or the third motor 109, or a combination thereof.

Shown in FIG. 4 is an end-on view of the three-axis gimbal with the monopole 101 facing away. The camera 110 and camera mounting plate 114 are attached to the third motor 109 via a suitable connection such that movements of the camera mounting plate 114 and camera 110 may be achieved via rotational movement of the third motor 109. Likewise, movement of the third motor 109 may be achieved via motion of the first motor 105 or the second motor 107. As illustrated in FIG. 4, the second motor 107 is positioning between third motor 109 and the monopole 101. The third motor 109 and the second motor 107 are linked using a connecting element 108, which as with other elements may take a unitary (single piece) or modular (more than one piece) construction. The connecting element 108 illustrated linking the second motor 107 and the third motor 109 is shown having two edges that are oriented about 90 degrees to one another, similar in shape to the camera mounting plate 114 and the first connecting element 106.

Figure 5:
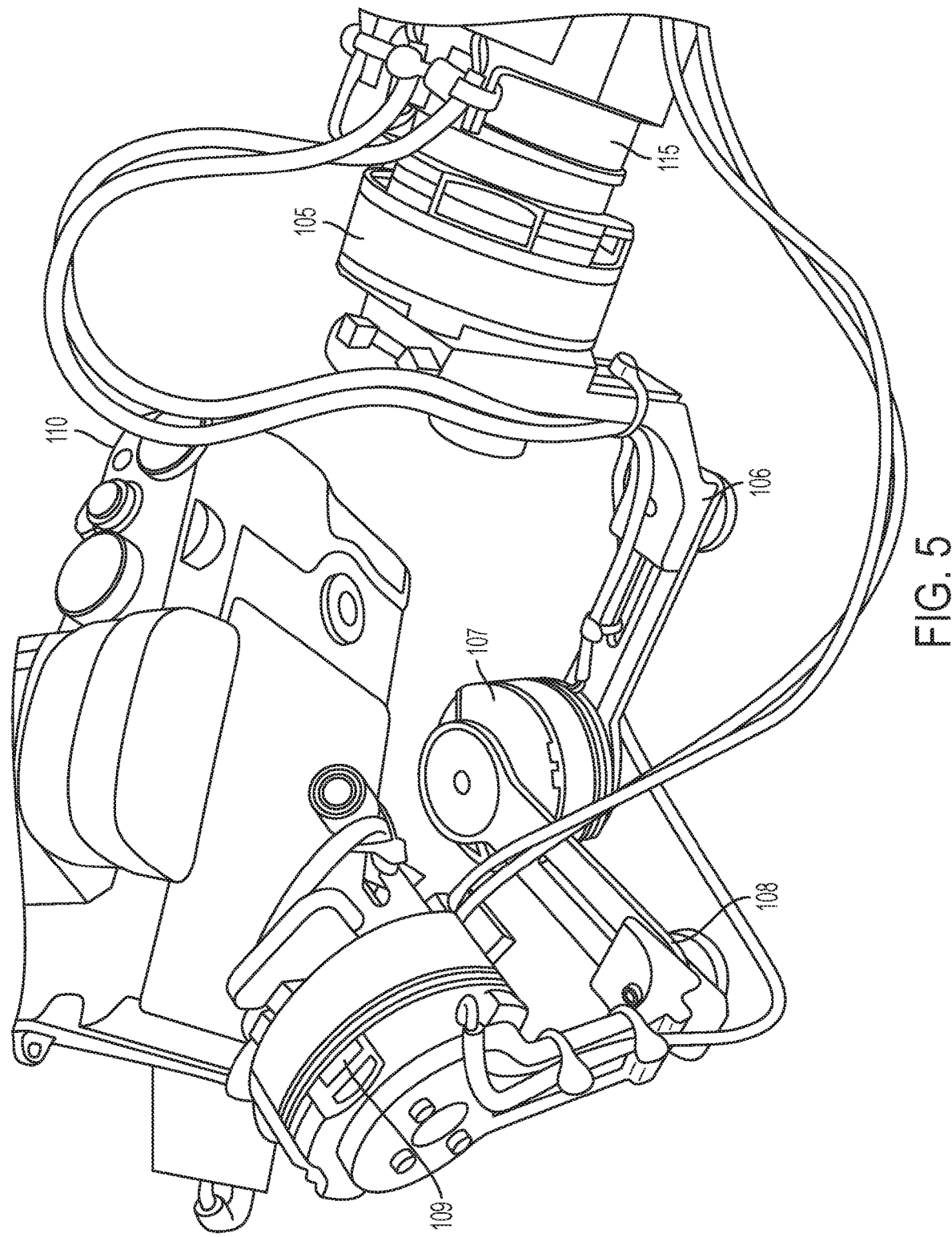
FIG. 5 illustrates a view of the three-axis gimbal, camera and attachment to a hand-held monopole.

A complete view of an example linkage between the connector 115 for the monopole 101, the first motor 105, the first connecting element 106, the second motor 107, the second connecting element 108, the second motor 109 and the camera mounting plate 114 is illustrated in FIG. 5. Here it may be appreciated that the first motor 105, second motor 107 and third motor 109 provide unique axes about which rotational movement may be provided. Moreover, the connecting elements 106 and 108 permit a wide range of motion such that the user may manipulate the camera 110 within a wide range of possible viewing angles.

Figure 6:
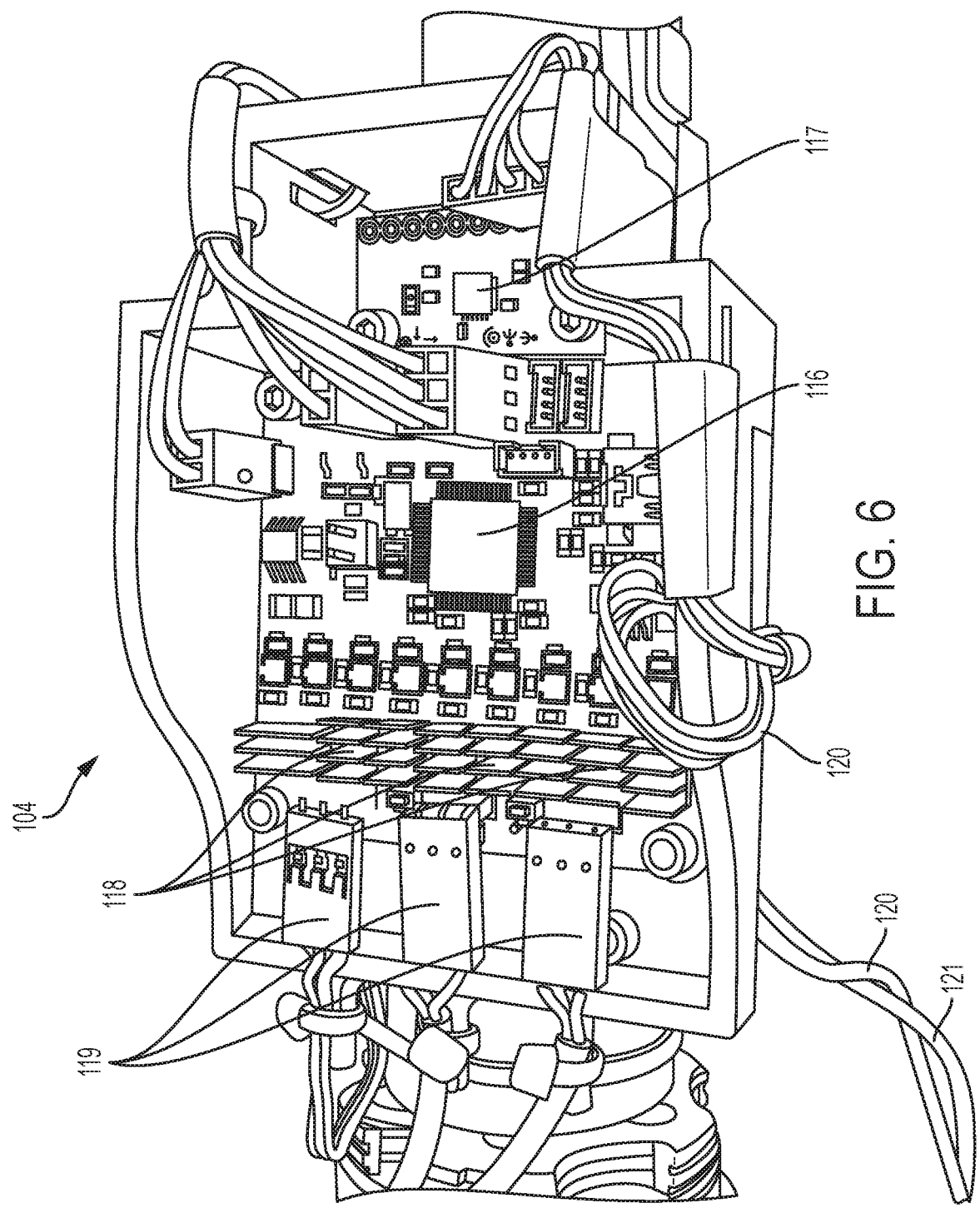
FIG. 6 illustrates example electronics included with a three-axis gimbal or hand-held monopole.

The first motor 105, second motor 107 and third motor 109 cooperate to control the camera 110 such that it is stabilized and may also be manipulated to different viewing angles by the user, e.g., using a user interface 111. As illustrated in FIG. 6, a module 104 may be provided with electronics that take in sensed information, e.g., from IMU 113 at the camera mounting plate 114 or the IMU 117 positioned with respect to the monopole 101. Module 104 may include a CPU 116, IMU 117, a PCB, connection interfaces 119, motor power amplifiers 118 and other electronics for receiving user inputs, sensed commands, and image data and provide outputs to various components, e.g., power and data output to the motors, image data outputs to a connected display, etc. As will be appreciated by those having ordinary skill in the art, the electronics of the module 104 may be varied, e.g., more of fewer IMUs may be utilized, other sensors may be utilized, various different types of connection interfaces may be provided, etc.

The CPU 116 executes instructions to control the first motor 105, the second motor 107 and third motor 109 such that the motion of the camera 110 is stabilized or smoothed, e.g., integrated with user inputs or movements of the monopole 101. The CPU may execute instructions of a program that permits controlled movements to be provided to the camera 110 via inputs from a user interface 111. In this regard, the CPU and program may translate user inputs, e.g., to a joystick user interface 111 or provided by manipulation of the monopole 101, or both, such that the first motor 105, second motor 107 and third motor 109 are commanded in a coordinated fashion for smooth, stabilized movement of the camera 110 according to movement of the joystick user interface 111 or the monopole 101 itself.

The CPU may stabilize the camera 110 by executing a program of instructions that automatically responds to sensed data, e.g., movement of the monopole 101 as sensed by IMU 117 or movement of the camera mounting plate 114 as sensed by IMU 113. For example, using sensed data from an IMU, the CPU may stabilize the motion of the camera 110 using the first motor 105, the second motor 107 and the third motor 109, or a combination thereof. As may be appreciated, the sensed data from IMU 113, IMU 117, other sensors, if any, and the user inputs provided via the user interface 111 may be integrated such that controlled, stabilized motion commands are given to the first motor 105, second motor 107 and the third motor 109, stabilizing or moving camera mounting plate 114 and the camera 110 according to user instructions.

Figure 7:
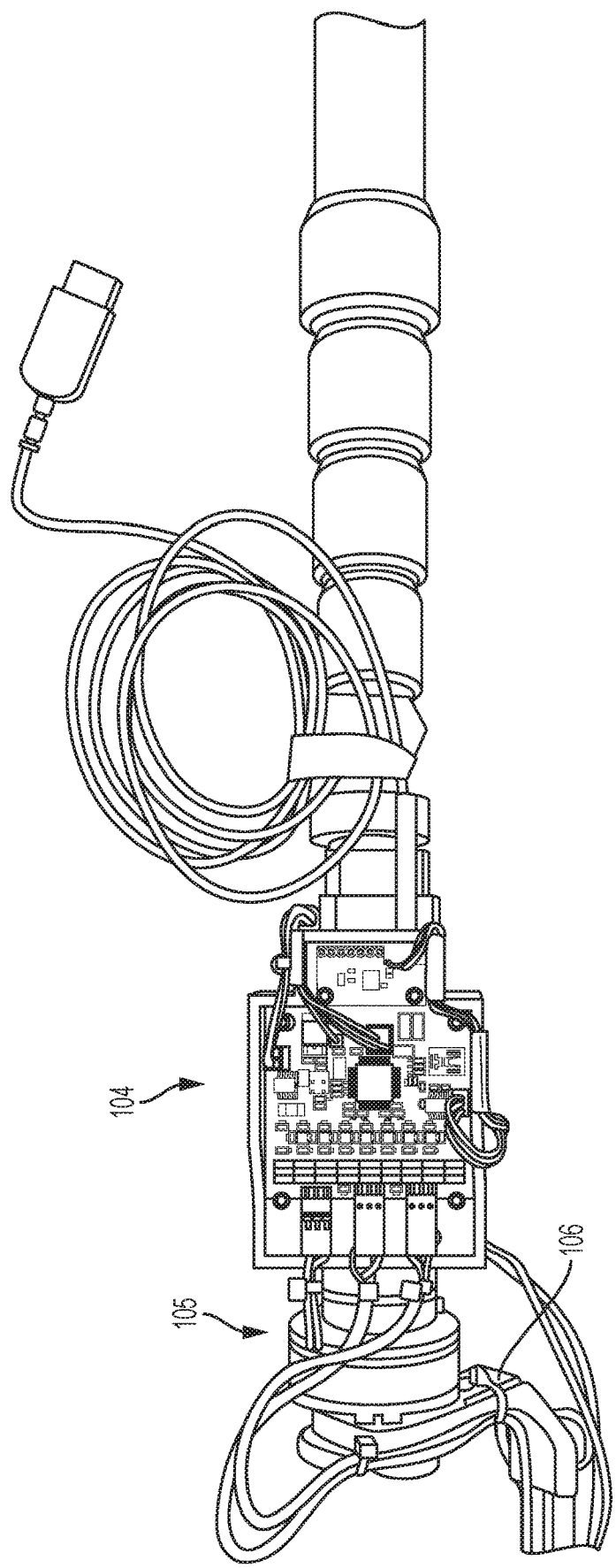
FIG. 7 illustrates a view of the electronics positioned on a hand-held monopole.

FIG. 7 offers a top view of the monopole 101 with a module 104 provided therewith. The module 104 may be provided in a variety of positions, although in the example of FIG. 7 the module 104 is attached at a distal end of the monopole 101, adjacent to the connector, first motor 105 and first connecting element 106.

Figure 8:
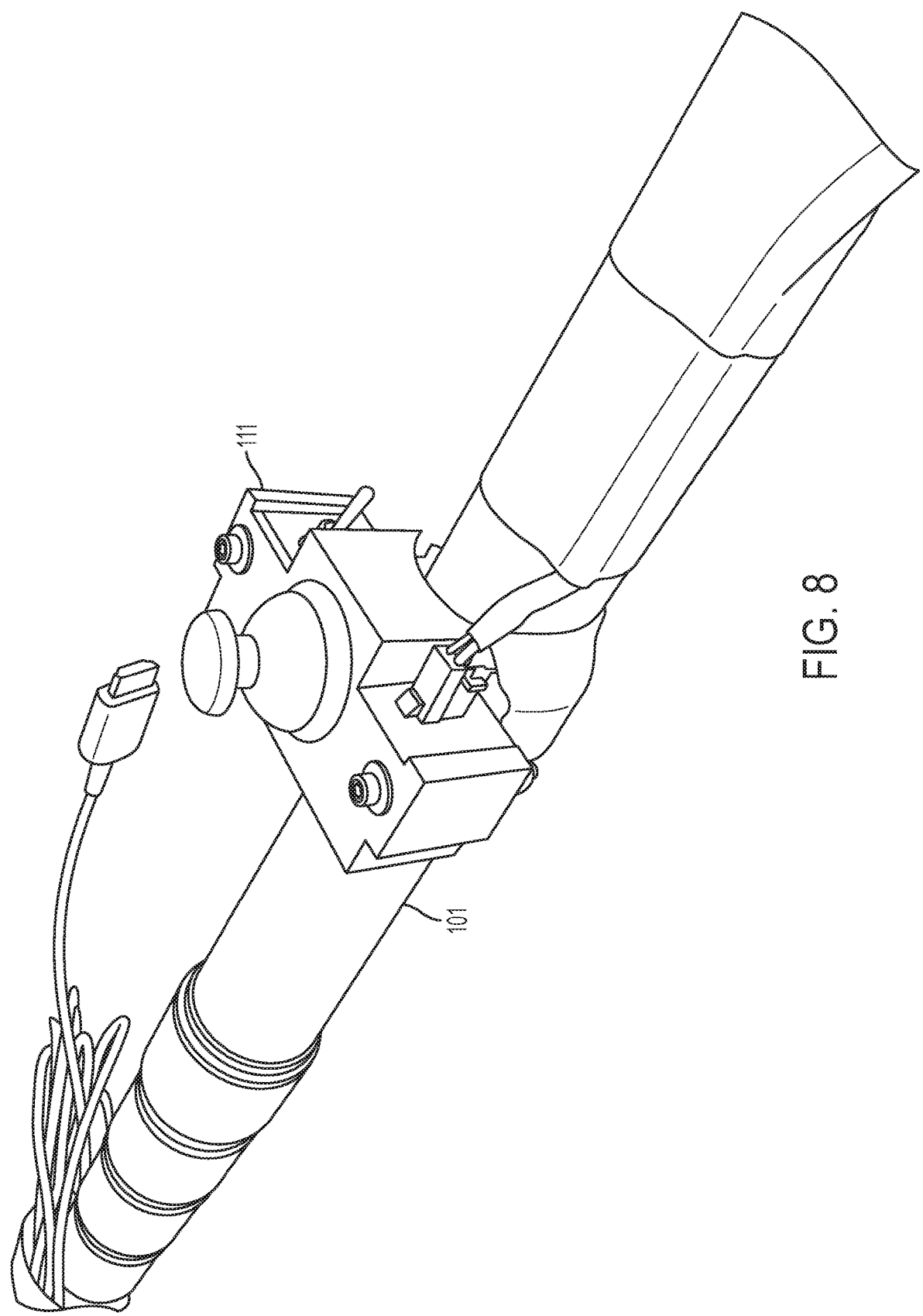
FIG. 8 illustrates a view of a user interface positioned on a hand-held monopole.

A user interface 111, as illustrated in the example of FIG. 8, provides the user with the ability to move the camera via the first motor 105, second motor 107 and third motor 109. Here, the user interface 111 is illustrated as a joystick type control. The movement of the joystick of the user interface 111 may provide inputs to the module 104 such that these inputs may be converted or transformed into commands for the first motor 105, second motor 107 or third motor 109, as appropriate.

Referring back to FIG. 1, a battery pack 112 may be provided, as illustrated in the example of FIG. 1 at the end of the monopole 101 opposite to the three axis gimbal. The battery pack 112 provides power to the module 104, user interface 111, the first motor 105, the second motor 107 and the third motor 109. The battery pack 112 may provide power via direct or indirect wiring with the various powered elements. As may be appreciated, the battery pack 112 may be wired to provide power to additional elements, e.g., camera 110.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A multi-axis gimbal comprising:
    a plurality of motors connected to the multi-axis gimbal;
    a camera mounting plate;
    at least one inertial measurement unit (IMU);
    a user interface comprising a joystick; and
    a central processing unit (CPU) configured to control the plurality of motors based on inputs from the at least one IMU and the joystick, wherein the control of the plurality of motors provide a coordinated stabilization to a camera configured to be mounted on the camera mounting plate.

2. The multi-axis gimbal of claim 1, wherein the control of the plurality of motors further points the camera at a target location, wherein the target location is selected by a user via the user interface.

3. The multi-axis gimbal of claim 2, wherein the target location varies and tracks a moving target object.

4. The multi-axis gimbal of claim 1, wherein the coordinated stabilization comprises keeping the camera pointed in a single absolute direction.

5. The multi-axis gimbal of claim 1, wherein the coordinated stabilization comprises keeping the camera fixed in relation to a multi-axis gimbal operator.

6. The multi-axis gimbal of claim 1, wherein the joystick is configured to provide at least one of a pan or tilt input, and wherein the CPU controls the plurality of motors based on the at least one of the pan or tilt input to impart a corresponding at least one of a pan or tilt movement to the camera.

7. The multi-axis gimbal of claim 1, wherein components of the multi-axis gimbal are positioned such that a camera viewing axis, a horizontal image axis, and a vertical image axis of the camera configured to be mounted on the camera mounting plate are not aligned with at least one of the plurality of motors in a first position of the multi-axis gimbal.

8. A multi-axis gimbal comprising:
a plurality of motors connected to the multi-axis gimbal;
a camera mounting plate;
at least one inertial measurement unit (IMU);
a user interface; and
a central processing unit (CPU) configured to control the plurality of motors based on inputs from the at least one IMU and the user interface, wherein the control of the plurality of motors provide a coordinated stabilization to a camera configured to be mounted on the camera mounting plate.

9. The multi-axis gimbal of claim 8, wherein the control of the plurality of motors further points the camera at a target location, wherein the target location is selected by a user via the user interface.

10. The multi-axis gimbal of claim 9, wherein the target location comprises a fixed location.

11. The multi-axis gimbal of claim 9, wherein the target location varies and tracks a moving target object.

12. The multi-axis gimbal of claim 8, wherein the coordinated stabilization comprises keeping the camera pointed in a single absolute direction.

13. The multi-axis gimbal of claim 8, wherein components of the multi-axis gimbal are positioned such that a camera viewing axis, a horizontal image axis, and a vertical image axis of the camera configured to be mounted on the camera mounting plate are not aligned with at least one of the plurality of motors in a first position of the multi-axis gimbal.

14. A system comprising:
a monopole attached to a multi-axis gimbal, wherein the multi-axis gimbal comprises:
a plurality of motors connected to the multi-axis gimbal;
a camera mounting plate;
at least one inertial measurement unit (IMU);
a user interface; and
a central processing unit (CPU) configured to control the plurality of motors based on inputs from the at least one IMU and the user interface, wherein the control of the plurality of motors provide a coordinated stabilization to a camera configured to be mounted on the camera mounting plate.

15. The system of claim 14, wherein the control of the plurality of motors further points the camera at a target location, wherein the target location is selected by a user via the user interface.

16. The system of claim 15, wherein the target location varies and tracks a moving target object.

17. The system of claim 15, wherein the coordinated stabilization comprises keeping the camera pointed in a single absolute direction.

18. The system of claim 14, wherein the coordinated stabilization comprises keeping the camera fixed in relation to a multi-axis gimbal operator.

19. The system of claim 14, wherein the user interface comprises a joystick, wherein the joystick is configured to provide at least one of a pan or tilt input, and wherein the CPU controls the plurality of motors based on the at least one of the pan or tilt input to impart a corresponding at least one of a pan or tilt movement to the camera.

20. The system of claim 14, wherein components of the multi-axis gimbal are positioned such that a camera viewing axis, a horizontal image axis, and a vertical image axis of the camera configured to be mounted on the camera mounting plate are not aligned with at least one of the plurality of motors in a first position of the multi-axis gimbal.

21. The system of claim 14, wherein a movement of the monopole is configured to be translated into a movement of the camera mounting plate by the CPU operating at least one of the plurality of motors.

* * * * *